United States Patent
Gay et al.

(10) Patent No.: US 9,105,066 B2
(45) Date of Patent: Aug. 11, 2015

(54) TRIP-BASED VEHICLE INSURANCE

(71) Applicant: STATE FARM MUTUAL AUTOMOBILE INSURANCE COMPANY, Bloomington, IL (US)

(72) Inventors: Christopher E. Gay, Dallas, TX (US);
Scott Thomas Christensen, Bloomington, IL (US); Gregory Hayward, Bloomington, IL (US); Steven Cielocha, Bloomington, IL (US); Todd Binion, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/203,015

(22) Filed: Mar. 10, 2014

(65) Prior Publication Data

US 2014/0257867 A1      Sep. 11, 2014

Related U.S. Application Data

(60) Provisional application No. 61/775,652, filed on Mar. 10, 2013.

(51) Int. Cl.
*G06Q 40/08* (2012.01)
*B60Q 1/00* (2006.01)
*G06Q 40/00* (2012.01)
*G07C 5/00* (2006.01)

(52) U.S. Cl.
CPC *G06Q 40/08* (2013.01); *B60Q 1/00* (2013.01); *G06Q 40/00* (2013.01); *G07C 5/00* (2013.01)

(58) Field of Classification Search
CPC .................................................. G06Q 40/08
USPC ............................................................ 705/4
See application file for complete search history.

(56) References Cited

U.S. PATENT DOCUMENTS

| | | | |
|---|---|---|---|
| 7,812,712 B2 | 10/2010 | White et al. |
| 7,865,378 B2 | 1/2011 | Gay |
| 7,870,010 B2 | 1/2011 | Joao |
| 8,027,853 B1 | 9/2011 | Kazenas |
| 8,423,239 B2 | 4/2013 | Blumer et al. |
| 2002/0111725 A1 | 8/2002 | Burge |

(Continued)

OTHER PUBLICATIONS

Radu Mihailescu; "An assessment Charter airline benefits for Port Elizabeth and the Eastern Cape"; p. 40; Chinese Business Review; Feb. 2010; ISSN 1537-1506.*

*Primary Examiner* — Edward Chang
(74) *Attorney, Agent, or Firm* — Marshall, Gerstein & Borun LLP; Randall G. Rueth

(57) ABSTRACT

Methods and systems for offering and providing trip-based vehicle insurance are provided. Information is received regarding a vehicle operator and a vehicle, and trip-based insurance policies including quantities of vehicle use units are offered to the customer. Based on selected coverage types, the insurance provider may generate an insurance quote for a policy having an amount of the vehicle use units and may facilitate a purchase transaction with the customer for the insurance policy. Once a policy is selected and purchased, the system and method monitor vehicle use to determine each use of a vehicle use unit. Each vehicle use unit generally corresponds to one vehicle trip, but additional vehicle trip limitations may be added that may result in additional charges when exceeded during the course of a vehicle trip.

20 Claims, 5 Drawing Sheets

(56) References Cited

U.S. PATENT DOCUMENTS

2005/0267784 A1 12/2005 Slen et al.
2006/0079280 A1 4/2006 LaPerch
2007/0299700 A1* 12/2007 Gay et al. .......................... 705/4
2013/0317693 A1 11/2013 Jefferies et al.

* cited by examiner

TRIP-BASED VEHICLE INSURANCE

CROSS-REFERENCE TO RELATED APPLICATIONS

This application claims the benefit of U.S. Provisional Application No. 61/775,652, filed Mar. 10, 2013, which is incorporated by reference herein.

TECHNICAL FIELD

The present disclosure generally relates to systems and methods for offering vehicle insurance policies, specifically offering vehicle insurance policies where coverage is measured by the trip usage of the vehicle.

BACKGROUND

Vehicle or automobile insurance exists to provide financial protection against physical damage and/or bodily injury resulting from traffic accidents and against liability that could arise therefrom. Typically, a customer purchases a vehicle insurance policy for a policy rate having a specified term. In exchange for payments from the insured customer, the insurer pays for damages to the insured which are caused by covered perils, acts, or events as specified by the language of the insurance policy. The payments from the insured are generally referred to as "premiums," and typically are paid on behalf of the insured over time at periodic intervals. An insurance policy may remain (or have a status or state of) "in-force" while premium payments are made during the term or length of coverage of the policy as indicated in the policy. An insurance policy may "lapse" (or have a status or state of "lapsed"), for example, when premium payments are not being paid or if the insured or the insurer cancels the policy.

Conventional vehicle insurance policies are typically based on an insurance "term," which specifies a fixed time period during which the coverage in in-force (usually six months), regardless of usage during the time period. Some policies may be based at least in part on an estimated distance that the vehicle may travel during the term, but distance traveled is highly variable over time. Therefore, conventional vehicle insurance policies that are priced according to a specified term may not accurately reflect the actual mileage or time that a vehicle is driven, metrics that are difficult to estimate, determine, and/or verify. Other vehicle insurance policies are instead based on the distance a vehicle travels. For example, an automobile insurance policy may be issued with a set price per mile driven. Such an insurance policy may be denominated by a certain number of miles (e.g., 5,000), just as a conventional policy may be denominated by a term of fixed duration (e.g., six months).

SUMMARY

In accordance with the described embodiments, the disclosure herein generally addresses vehicle insurance offered and issued based on the number of trips a vehicle makes. This is addressed through the introduction of a "vehicle use unit," which may correspond with one vehicle trip in some embodiments. In some embodiments, the vehicle use unit may be adjusted based on the time the vehicle is used, the distance the vehicle travels, or other information collected during the vehicle trip.

Disclosed herein are methods, systems, and computer-readable media storing instructions for offering vehicle insurance for a vehicle. One embodiment consists of a computer-implemented method including receiving a vehicle identifier that identifies the vehicle and a vehicle operator identifier that identifies a vehicle operator, determining a cost per vehicle use unit based on the vehicle identifier and the vehicle operator identifier, generating at least one vehicle insurance policy based on the cost per vehicle use unit, and providing an option to purchase the vehicle insurance policy to a customer associated with the vehicle.

Another embodiment consists of a computer system including a communication module adapted to communicate data, a program memory adapted to store non-transitory computer executable instructions, and at least one processor adapted to interface with the communication module, wherein the processor is configured to execute the non-transitory computer executable instructions to cause the computer system to: receive a vehicle identifier that identifies the vehicle and a vehicle operator identifier that identifies a vehicle operator, determine a cost per vehicle use unit based on the vehicle identifier and the vehicle operator identifier, generate at least one vehicle insurance policy based on the cost per vehicle use unit, and provide, to a customer associated with the vehicle via the communication module, an option to purchase the vehicle insurance policy to a customer associated with the vehicle.

Yet another embodiment consists of a tangible, non-transitory computer-readable medium storing instructions that when executed by at least one processor of a computer system cause the computer system to receive a vehicle identifier that identifies the vehicle and a vehicle operator identifier that identifies a vehicle operator, determine a cost per vehicle use unit based on the vehicle identifier and the vehicle operator identifier, generate at least one vehicle insurance policy based on the cost per vehicle use unit; and provide, to a customer associated with the vehicle, an option to purchase the vehicle insurance policy.

In some embodiments, the cost per vehicle use unit includes a cost associated with a vehicle trip, comprising one or more of the following: each round trip from and back to a location; each time an engine of the vehicle is started; each time the engine of the vehicle is shut off; each time the engine of the vehicle is put into an operational state to propel the vehicle; each time the engine of the vehicle is taken out of an operational state to propel the vehicle; each time the vehicle operator enters the vehicle; each time the vehicle operator exits the vehicle; each time the vehicle arrives at a geographic location; each time the vehicle leaves a geographic location; or each time the vehicle is refueled. The cost per vehicle use unit may also include a cost associated with one or more of the following: a predetermined maximum distance traveled by the vehicle in one vehicle trip; a predetermined maximum duration of vehicle operation within one vehicle trip; a predetermined maximum duration during which the engine of the vehicle is running in one vehicle trip; a predetermined maximum number of times the engine of the vehicle is started or shut off in one vehicle trip; a predetermined number of times the vehicle operator enter or exits the vehicle in one vehicle trip; a predetermined number of times the vehicle is near a geographic location; a predetermined maximum speed of the vehicle during the vehicle trip; a predetermined maximum revolutions per minute of the engine of the vehicle during the vehicle trip; a predetermined maximum lateral acceleration of the vehicle during the vehicle trip; a predetermined maximum longitudinal acceleration of the vehicle during the vehicle trip; a predetermined maximum number of occupants within the vehicle during the vehicle trip; an indication of unsafe vehicle operation; or an indication of hazardous weather conditions. For example, a trip on a snowy night with three teenage occupants may cost more than a trip of equal length by a middle-aged vehicle operator on a sunny day.

In some embodiments, the systems, methods, and computer-readable media may also receive a selection by the customer of at least one vehicle insurance policy and facilitate a purchase transaction with the customer for the selected vehicle insurance policy. Additionally, some embodiments may receive a signal indicating an occurrence of the vehicle trip and record the occurrence of the vehicle trip. Recording the vehicle trip may include creating a timestamp of the occurrence, comprising one or more of a start time of the vehicle trip, an end time of the vehicle trip, a distance traveled, a starting location of the vehicle trip, a terminal location of the vehicle trip, an indication of unsafe vehicle operation, an indication of weather conditions, or an indication of occupants of the vehicle. In some embodiments, the systems, methods, and computer-readable media may also determine a number of remaining vehicle trips in the purchased vehicle insurance policy and automatically facilitate a purchase of additional vehicle use units when the number of remaining vehicle use units falls below a predetermined threshold. In some embodiments, the signal indicating the occurrence of the vehicle trip may be generated by one or more sensors.

In some embodiments, providing the option to purchase the vehicle insurance policy to the customer may further include providing an option to purchase at least one type of vehicle insurance coverage and providing an option to purchase at least one quantity of vehicle use units. In addition, some embodiments may identify an existing insurance policy associated with the customer and provide to the customer an option to supplement the existing insurance policy with the vehicle insurance policy.

Some embodiments may further receive one or more vehicle use identifiers that identify information regarding one or more recurring uses of the vehicle by the one or more vehicle operators, including: a parking location, a destination location, a route, a type of use, a time of use, a pattern of unsafe vehicle operation, a number of occupants within the vehicle, or a cargo; wherein the cost per vehicle use unit is based, at least in part, on the one or more vehicle use identifiers.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1:
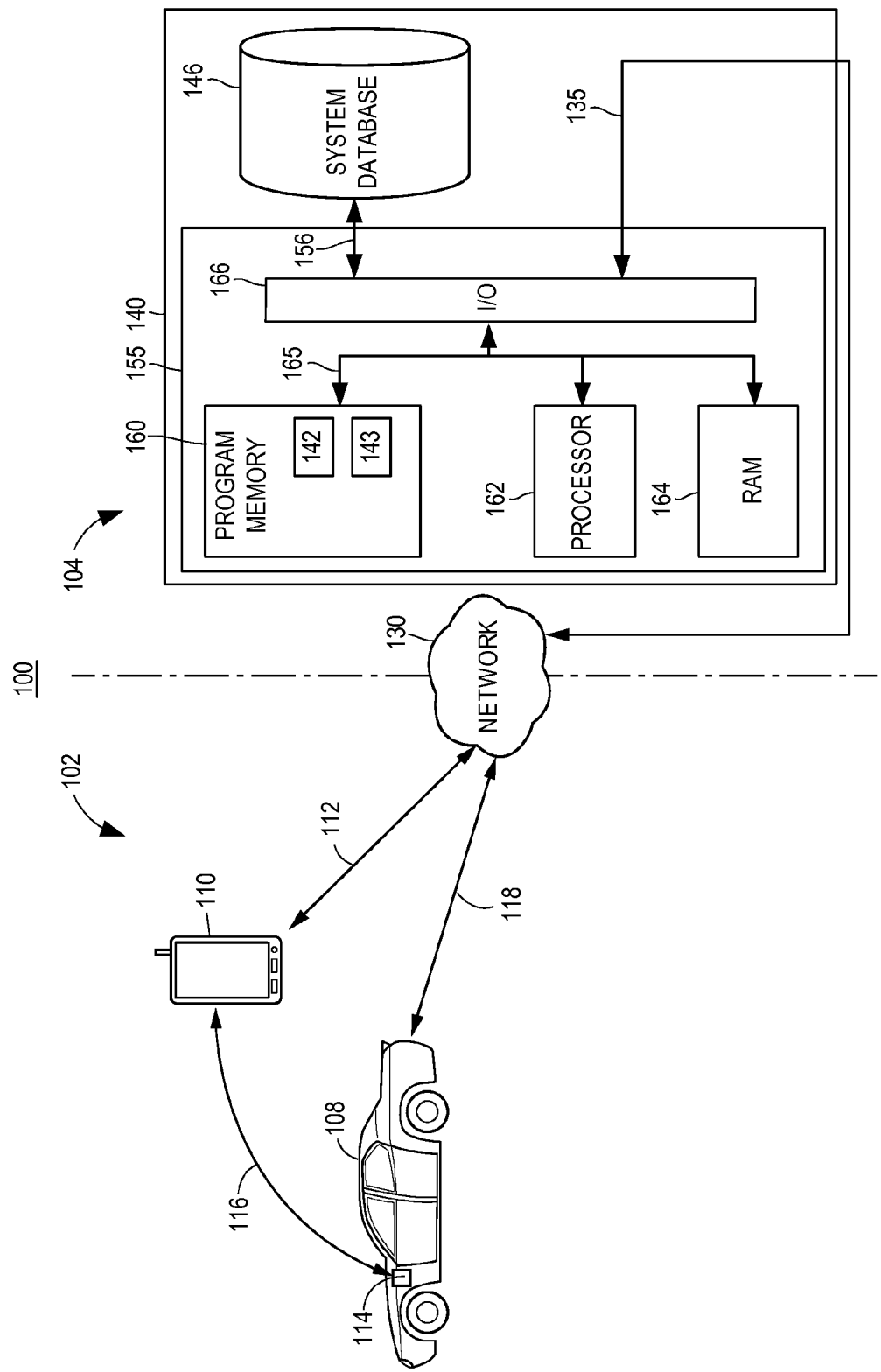
FIG. 1 illustrates a block diagram of a computer network, a computer server, a mobile device, and an on-board computer on which an exemplary trip-based insurance offer and purchase method and an exemplary trip-based insurance monitoring method may be implemented in accordance with the described embodiments.

The systems and methods disclosed herein generally relate to processing trip-based vehicle insurance policies, including monitoring vehicle trips to determine policy expiration. In contrast to traditional insurance policies, trip-based vehicle insurance policies provide coverage based at least in part upon the number of vehicle trips or uses of a vehicle. For example, a trip-based vehicle insurance policy may include a quantity of vehicle use units (e.g., 50 units), thereby providing insurance coverage for a number of vehicle trips. The vehicle use units may further limit the vehicle trips by distance, duration, number of stops, or other metrics designed to constrain vehicle trips from reaching arbitrarily long lengths. Under such a trip-based vehicle insurance policy, the policy is charged one vehicle use unit for each vehicle trip (or more than one unit if the vehicle trip exceeds the vehicle trip limitations set by the policy). In alternative embodiments, the vehicle use unit may correspond to a certain monetary value, and each vehicle trip may be reviewed upon completion to determine the number of vehicle use units to charge the policy. For example, the trip-based vehicle insurance policy may include a quantity of 500 vehicle use units corresponding to a monetary value of $500. Upon completion of a vehicle trip, a cost for the vehicle trip may be determined (e.g., 0.65 vehicle use units for an ordinary commuter trip, 2.85 vehicle use units for a late-night trip in the rain with multiple passengers, etc.). As a variation on these alternative embodiments, the trip-based vehicle insurance policy may not include vehicle use units as such, but may include the purchase of a certain initial monetary value in vehicle trips, which initial monetary value is reduced by the cost of each trip, as determined based upon completion of each vehicle trip as described above. The policy expires when none of the purchased vehicle use units remain to be used or when the aggregate value of the vehicle trips reaches the initial monetary value. Some policies may have an automatic repurchase feature, such that additional vehicle use units are purchased (or additional initial monetary values are added) if the remaining balance falls below a predetermined threshold.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f).

Accordingly, as used herein, the term "vehicle" may refer to any of a number of motorized transportation devices. A vehicle may be a car, truck, bus, train, boat, plane, motorcycle, snowmobile, other personal transport devices, etc. As used herein, a "vehicle trip" means one use of a vehicle to travel from a departure location to a terminal location. The departure and terminal locations may be the same location, such as where a vehicle travels from its usual storage location to a third point and then back to its usual storage location. The departure and terminal locations may alternatively be different locations, such as where a vehicle has more than one usual storage location or where the usual storage location is changed. The usual storage location of a vehicle may include a geographic area, a port, a dock, a hangar, a parking spot, or a garage. A vehicle trip may include one or more stops along the route of the vehicle between the departure location and the terminal location. Also as used herein, a "stop" means any point along the route of the vehicle during a vehicle trip where the vehicle trip is interrupted for a period of time, during which the vehicle's progress between the departure location and the terminal location is halted, other than by the ordinary and momentary cessation of movement of the vehicle in the usual course of operation or as required by control signals, by law, or to avoid collisions. For example, a car may pause at a traffic light, stop sign, toll booth, or along a road to yield way to an emergency vehicle without such pause being a "stop" as used herein. In various embodiments, stops of a vehicle may be measured in a number of ways, including time, engine shut-down, or location (e.g., exiting a road or entering a dock).

Additionally, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy, or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to vehicle or automobile insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," and "customer" are used interchangeably herein to refer to a person, party, or entity (e.g., a business or other organizational entity) that is covered by the insurance policy, e.g., whose insured article or entity (e.g., property, life, health, auto, home, business) is covered by the policy.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

FIG. 1 illustrates a block diagram of an exemplary trip-based insurance system 100 on which the exemplary trip-based insurance offer and purchase method 300 and the exemplary trip-based insurance monitoring method 400 may be implemented. The high-level architecture includes both hardware and software applications, as well as various data communications channels for communicating data between the various hardware and software components. The trip-based insurance system 100 may be roughly divided into front-end components 102 and back-end components 104. The front-end components 102 may present information to and receive information from a vehicle operator, client device user, or customer and monitor the use of a vehicle 108 (e.g., a car, truck, motorcycle, etc.) by the vehicle operator. The user may interact with the system 100 using a client device 110 (e.g., a smart phone, a tablet computer, a desktop computer, a special purpose computing device, etc.), which may be communicatively connected to an on-board computer 114. To monitor the vehicle 108, the front-end components 102 may include one or more sensors (not shown) installed within the vehicle 108 that may communicate with the client device 110 or an on-board computer 114. The front-end components 102 may further process the sensor data using the client device 110 or on-board computer 114 to determine when a vehicle trip occurs. In some embodiments of the system, the front-end components 102 may communicate with the back-end components 104 via a network 130. The back-end components 104 may use one or more servers 140 to receive data from the user or sensors from the front-end components 102, determine insurance policies to present to the user, facilitate the purchase of an insurance policy, and monitor the vehicle 108 for use under the insurance policy. A record of usage of the vehicle 108 may be stored either in the front-end components or in the back-end components via network 130.

The front-end components 102 may be disposed within one or more client devices 110 or on-board computers 114, which may be permanently or removably installed in the vehicle 108. The client device 110 or the on-board computer 114 may interface with one or more sensors (not shown) within the vehicle 108 (e.g., an ignition sensor, an odometer, a system clock, a speedometer, a tachometer, an accelerometer, a gyroscope, a compass, etc.), which sensors may also be incorporated within or connected to the client device 110 or the on-board computer 114. In some embodiments, the client device 110 may be a specialized computing device designed to monitor and record vehicle usage, either independently or in conjunction with the on-board computer 114. The on-board computer 114 may supplement the functions performed by the client device 110 described herein by, for example, sending or receiving information to and from the client device 110 or the sensors (not shown). In one embodiment, the on-board computer 114 may perform all of the functions of the client device 110 described herein, in which case no client device 110 may be present in the system 100. In another embodiment, the client device 110 may perform all of the functions of the on-board computer 114, in which case no on-board computer 114 may be present in the system 100. Either or both of the client device 110 or on-board computer 114 may communicate with the network 130 over links 112 and 118, respectively. Additionally, the client device 110 and on-board computer 114 may communicate with one another directly over link 116.

The client device 110 may be either a general-use personal computer, cellular phone, smart phone, tablet computer, or a dedicated vehicle use monitoring device. Although only one client device 110 is illustrated, it should be understood that a plurality of client devices 110 may be used in some embodiments. Particularly, one client device 110 (e.g., a desktop computer) may be used to implement the trip-based insurance offer and purchase method 300, while another client device 110 (e.g., a smart phone or dedicated vehicle use monitoring device) may be used to implement the trip-based insurance monitoring method 400. The on-board computer 114 may be a general-use on-board computer capable of performing many functions relating to vehicle operation or a dedicated computer for monitoring vehicle usage. Further, the on-board computer 114 may be installed by the manufacturer of the vehicle 108 or as an aftermarket modification to the vehicle 108. In some embodiments, the client device 110 or on-board computer 114 may be thin-client devices that outsource some or most of the processing to the server 140.

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol. The back-end components 104 include one or more servers 140. Each server 140 may include one or more computer processors adapted and configured to execute various software applications and components of the trip-based insurance system 100, in addition to other software applications. The server 140 may further include a database 146, which may be adapted to store data related to the operation of the trip-based insurance system 100. Such data might include, for example, date and times of vehicle use, duration of vehicle use, distance traveled by the vehicle 108 in each use, speed of the vehicle 108, RPM or other tachometer readings of the vehicle 108, lateral and longitudinal acceleration of the vehicle 108, number and location of stops made by the vehicle 108 during each use, or other data relating to use of the vehicle 108, the vehicle operator, or the vehicle insurance policy, which may be uploaded to the server 140 via the network 130. The server 140 may access data stored in the database 146 when executing various functions and tasks associated with the operation of the trip-based insurance system 100.

Although the trip-based insurance system 100 is shown to include one vehicle 108, one client device 110, one on-board computer 114, and one server 140, it should be understood that different numbers of vehicles 108, client devices 110, on-board computers 114, and servers 140 may be utilized. For example, the system 100 may include a plurality of servers 140 and hundreds of client devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information. This may in turn support a thin-client embodiment of the client device 110 or on-board computer 114 discussed herein.

The server 140 may have a controller 155 that is operatively connected to the database 146 via a link 156. It should be noted that, while not shown, additional databases may be linked to the controller 155 in a known manner. For example, separate databases may be used for vehicle operator information, vehicle insurance policy information, and vehicle use information. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications may include a client application 142 for implementing the trip-based insurance offer and purchase method 300 or the trip-based insurance monitoring method 400 on the server 140. The software applications may further include a web server application 143 responsible for generating data content to be included in web pages sent from the web server 140 to the client device 110 or on-board computer 114. The various software applications may be executed on the same computer processor as the client application 142 or the web server application 143, or the software application may be executed on different computer processors.

Figure 2:
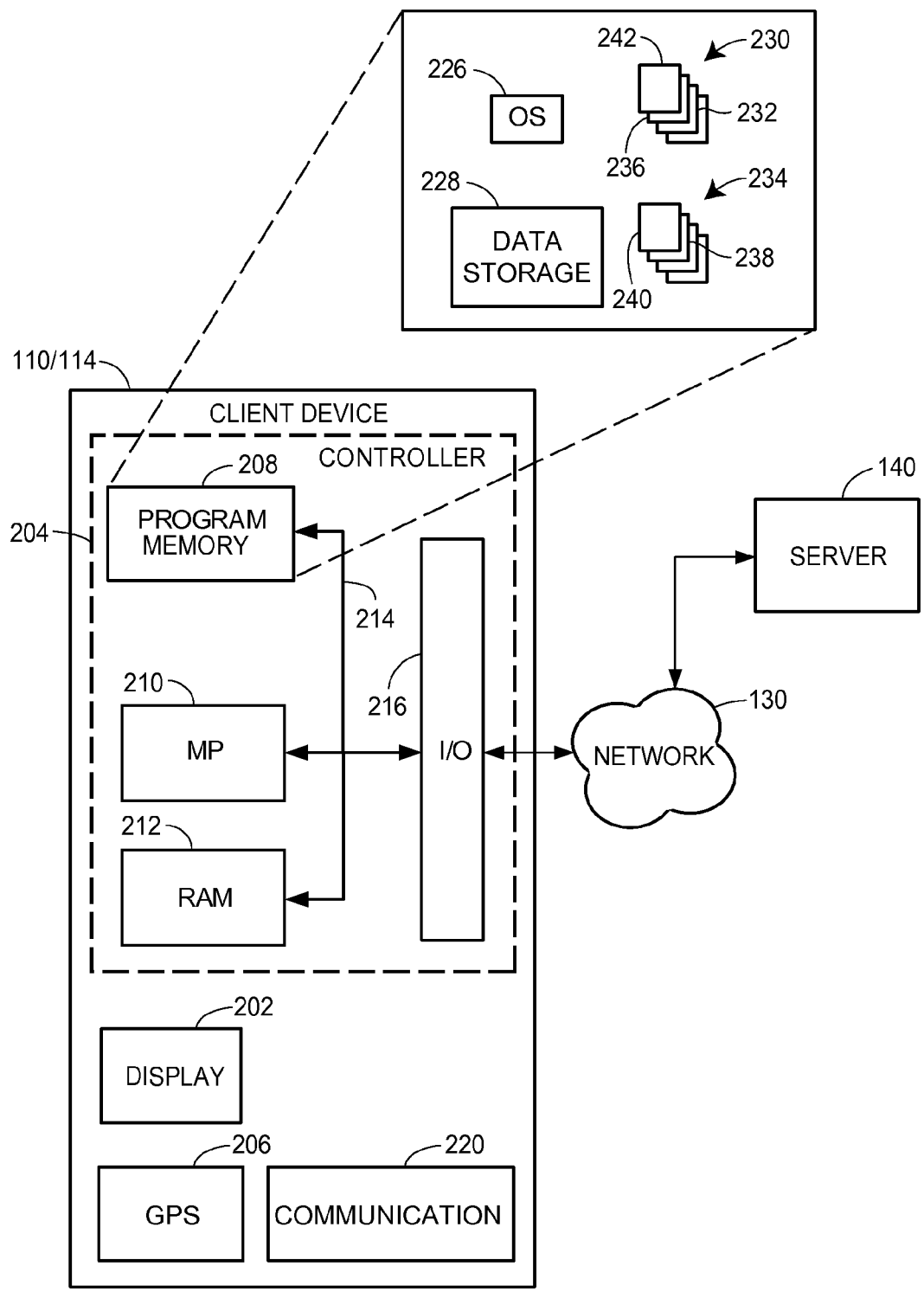
FIG. 2 illustrates a block diagram of an exemplary client device or on-board computer.

FIG. 2 illustrates a block diagram of an exemplary client device 110 or an exemplary on-board computer 114 consistent with the system 100. The client device 110 or on-board computer 114 may include a display 202, a Global Positioning System (GPS) unit 206, a communication unit 220, one or more additional sensors (not shown), a user-input device (not shown), and, like the server 140, a controller 204. In some embodiments, the client device 110 and on-board computer 114 may be integrated into a single device, or either may perform the functions of both. Functions performed by either the client device 110 or the on-board computer 114 may also be performed by the client device 110 in concert with the on-board computer 114.

When implementing the trip-based insurance offer and purchase method 300, the controller 204 may communicate with the server 140 to provide information regarding the vehicle operator or the vehicle 108. The client device 110 or the on-board computer 114 may further receive information regarding one or more vehicle insurance policies, including trip-based insurance policies, from the server 140 and display the information to the user using the display 202 or other means. The client device 110 or the on-board computer 114 may also receive selections of policy options from the user and communicate with the server 140 via the network 130 to facilitate a purchase of one or more vehicle insurance policies. In some embodiments, communication between the controller 204 and the server 140 may include the use of the communication unit 220. Additionally, or alternatively, the client device 110 or the on-board computer 114 may communicate with the server 140 to transmit or receive information regarding vehicle usage or the vehicle insurance policy (e.g., average trip length, remaining trips in the policy, etc.).

When implementing the trip-based insurance monitoring method 400, the controller 204 may receive sensor data, determine vehicle usage, and communicate information regarding vehicle trips to the server 140. Sensor data regarding vehicle usage may come from the GPS unit 206 or other sensors (not shown) incorporated within the client device 110 or on-board computer 114. Additionally, or alternatively, the communication unit 220 may receive sensor data from one or more external sensors (not shown) within the vehicle 108. The sensor data may be processed by the controller 204 to determine vehicle usage. Additionally, the controller 204 may determine information regarding vehicle usage (e.g., trip length, trip duration, average speed, acceleration, etc.). Additionally, or alternatively, the client device 110 or on-board computer 114 may transmit the sensor data to the server 140 for processing or may receive information from the server 140 for presentation to the vehicle operator via the network 130 (e.g., remaining trips in the vehicle insurance policy).

Similar to the controller 155, the controller 204 includes a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and a plurality of software routines 234. The operating system 226, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 228 may include data such as user profiles and preferences, application data for the plurality of applications 230, routine data for the plurality of routines 234, and other data necessary to interact with the server 140 through the digital network 130. In some embodiments, the controller 204 may also include, or otherwise be communicatively connected to, other data storage mechanisms (e.g., one or more hard disk drives, optical storage drives, solid state storage devices, etc.) that reside within the client device 110 or on-board computer 114.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although the FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The communication unit 220 may communicate with one or more external sensors (not shown) within the vehicle 108, client devices 110, on-board computers 114, or servers 140 via any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 220 may also be capable of communicating using a near field communication standard (e.g., ISO/IEC 18092, standards provided by the NFC Forum, etc.). Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, client devices 110, on-board computers 114, or servers 140.

The GPS unit 206 may use "Assisted GPS" (A-GPS), satellite GPS, or any other suitable global positioning protocol (e.g., the GLONASS system operated by the Russian government) or system that locates the position of the client device 110 or on-board computer 114. For example, A-GPS utilizes terrestrial cell phone towers or Wi-Fi hotspots (e.g., wireless router points) to more accurately and more quickly determine location of the client device 110 or on-board computer 114, while satellite GPS generally is more useful in more remote regions that lack cell towers or Wi-Fi hotspots. The GPS unit 206 and the one or more other sensors (not shown) may be referred to collectively as the "sensors" of the client device 110 or on-board computer 114. Of course, it will be appreciated that additional GPS units 206 may be added to the client device 110 or on-board computer 114.

The user-input device (not shown) may include a "soft" keyboard that is displayed on the display 202 of the client device 110 or on-board computer 114, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

The one or more processors 210 may be adapted and configured to execute any of one or more of the plurality of software applications 230 or any one or more of the plurality of software routines 234 residing in the program memory 204, in addition to other software applications. One of the plurality of applications 230 may be a client application 232 that may be implemented as a series of machine-readable instructions for performing the various tasks associated with implementing part or all of the trip-based insurance offer and purchase method 300 or the trip-based insurance monitoring method 400, discussed below, as well as receiving information at, displaying information on, and transmitting information from the client device 110 or on-board computer 114. One of the plurality of applications 230 may be a native web browser 236, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server 140. Another application of the plurality of applications may include an embedded web browser 242 that may be implemented as a series of machine-readable instructions for receiving, interpreting, and displaying web page information from the server 140. One of the plurality of routines may include a vehicle insurance purchase routine 238 corresponding to part or all of the trip-based insurance offer and purchase method 300. The vehicle insurance purchase routine 238 may receive information from the user and communicate with the serve 140 via the network 130 to facilitate the selection and purchase of one or more vehicle insurance policies. Another routine in the plurality of routines may include a vehicle trip monitoring routine 240 corresponding to part or all of the trip-based insurance monitoring method 400. The vehicle trip monitoring routine 240 may process data from the sensors to determine and record the occurrence of a vehicle trip under the terms of the insurance policy.

A user may launch the client application 232 from the client device 110 or on-board computer 114 to access the server 140 to implement part or all of the trip-based insurance offer and purchase method 300 or the trip-based insurance monitoring method 400. Additionally, the user may also launch or instantiate any other suitable user interface application (e.g., the native web browser 236, or any other one of the plurality of software applications 230) to access the server 140 to realize part or all of the trip-based insurance offer and purchase method 300 or the trip-based insurance monitoring method 400.

In embodiments where the client device 110 or on-board computer 114 is a thin-client device, the server 140 may perform many of the processing functions remotely that would otherwise be performed by the client device 110 or on-board computer 114. In such embodiments, the client device 110 or on-board computer 114 may receive data from the user or from the sensors and transmit the data to the server 140 for remote processing via the network 130.

Figure 3:
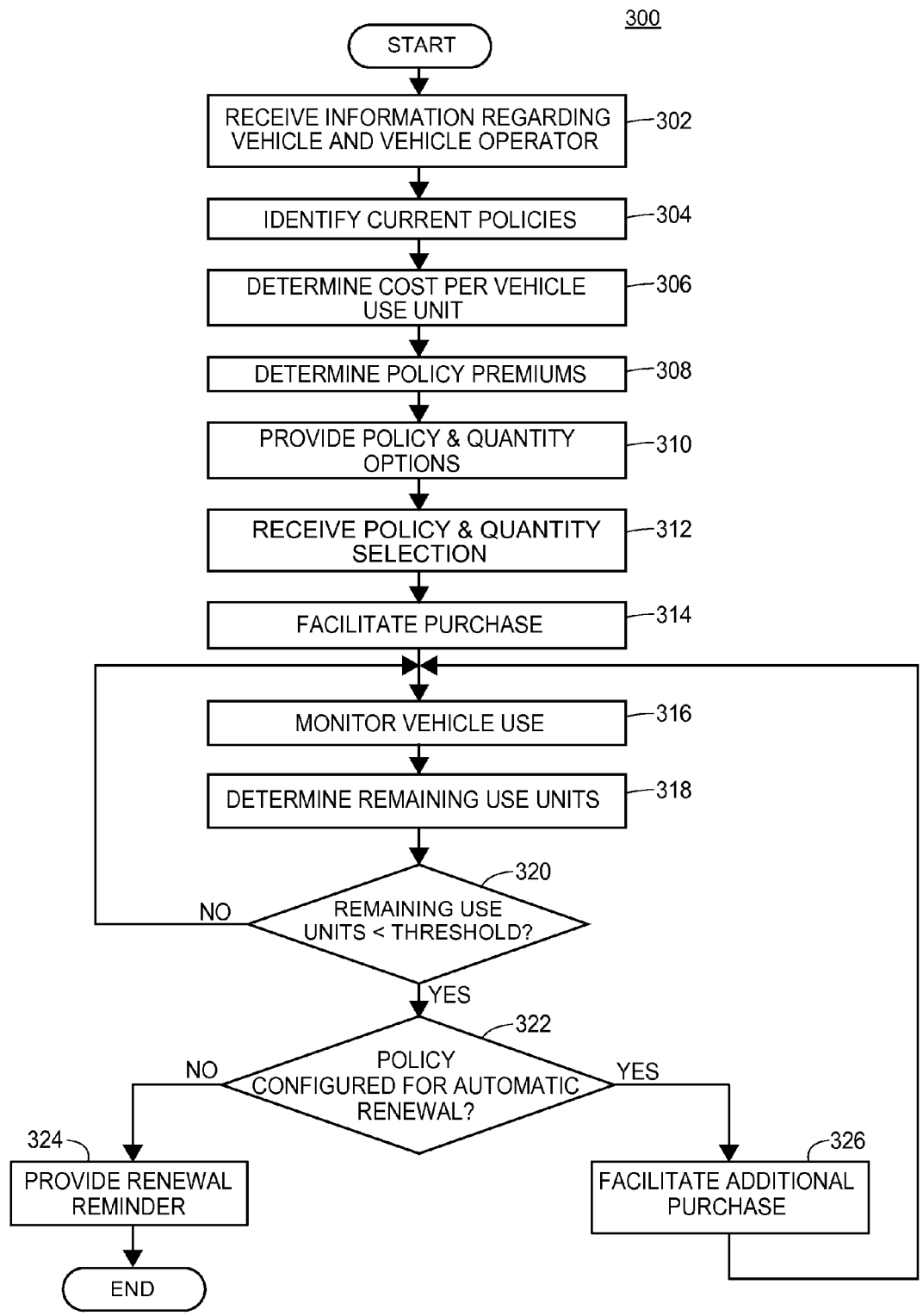
FIG. 3 illustrates a flow diagram of an the exemplary trip-based insurance offer and purchase method in accordance with the presently described embodiments.

FIG. 3 is a flow diagram depicting an exemplary embodiment of a trip-based insurance offer and purchase method 300, which may be implemented by the trip-based insurance system 100. More particularly the method 300 may be performed by the server 140, in some parts by communication with the client device 110. The client device 110 may initiate the method 300 by a command from the user via the client application 232, native web browser 236, the embedded web browser 242, or other means of establishing a communication connection between the client device 110 and the server 140. The server 140 receives information from the user at block 302, identifies any current policies linked to the user, vehicle operator, or vehicle 108 at block 304, determines a cost per vehicle use unit at block 306, and determines policy premiums for at least one vehicle insurance policy at block 308. The server 140 then provides one or more vehicle insurance policies to the user at block 310, receives a selection from the user at block 312, and facilitates a purchase of the selected vehicle insurance policy or policies at block 314. Once the vehicle insurance policy is in force, the server 140 monitors vehicle use to determine the number of vehicle use units used at block 316, determines the number of remaining vehicle use units based on the policy coverage at block 318, and determines whether the number of remaining vehicle use units is less than a threshold number at block 320. When the server 140 determines that the number of remaining vehicle use units is less than the threshold at block 320, it may further determine at block 322 whether the vehicle insurance policy is configured for automatic renewal. If the vehicle insurance policy is not configured for automatic renewal, the server 140 may cause a renewal reminder to be generated and provided to the user at block 324. If the vehicle insurance policy is configured for automatic renewal, the server 140 may facilitate an additional purchase of vehicle use units at block 326, following which the server 140 may continue to monitor vehicle use at block 316.

Following the initiation of the method 300, the server 140 may request and receive information from the user at block 302. This may include a request from the server 140 to the client device 110 for information relevant to the actuarial determination of policy rates, particularly vehicle operator information, customer information, vehicle information, and vehicle use information. In some embodiments, the server 140 may request information from the user of the client device 110 in one or more series of questions, some of which may include suggested responses based on information retrieved from the system database 146. Alternatively, the user may provide information to the server 140 in response to a series of prompts generated by the client application 232, or the user may select information to provide to the server 140. The vehicle operator information may include information regarding the vehicle operator (and, where different, the customer or user of the client device 110), such as the vehicle operator's name, date of birth, residence, operator's license ID number and issuing entity, prior insurance coverage, prior operating history (e.g., length of time licensed, accidents, damage, claims, etc.), associated vehicles, criminal history, financial history, or other relevant information regarding the vehicle operator. Where the customer is a separate entity from the vehicle operator, additional information regarding the customer may be requested or received, including the customer's vehicles, operations, insurance policies, insurance history, claims history, creditworthiness, or other relevant information regarding the customer. The vehicle information may include a vehicle type, registration number, registering entity, vehicle maker, vehicle model, vehicle year, vehicle mileage, vehicle time in operation, vehicle configuration, vehicle condition, standard or additional equipment installed in the vehicle, vehicle license plate number and issuing entity, one or more addresses associated with the vehicle (e.g., garaging address), or other information relating to the vehicle 108. Additionally, the vehicle use information may include typical routes traveled, typical timing of vehicle operation, frequently visited locations, driving patterns or habits of the vehicle operator (e.g., hard braking, excessive acceleration, lateral swerving, maintaining insufficient distance from other vehicles, insufficient mirror checking, excessive time looking away from the direction of vehicle travel, etc.), typical trip length, typical trip duration, frequency of stops during trips, typical number of stops during trips, typical passengers or cargo transported, or other information relating to vehicle usage. The information may be entered by the user into the client device 110 and transmitted to the server 140 via the network 130.

Using the information received in block 302, the server 140 may attempt to identify any existing policies associated with the customer, vehicle 108, or vehicle operator. For example, the server 140 may determine that the vehicle 108 is covered under an existing trip-based vehicle insurance policy or under a traditional, time-based insurance policy for the customer but not for the identified vehicle operator. As another example, the server 140 may identify a homeowner's policy or another insurance policy associated with the vehicle operator. As a further example, the server 140 may identify a vehicle insurance policy of the vehicle operator covering another vehicle 108 located at the same or a different address. Where an existing policy is identified that may be combined with trip-based insurance, the server 140 may generate a request to the user to select whether to add coverage to an existing policy or to create a new policy. For example, a user may have an existing traditional vehicle insurance policy covering a first vehicle and a separate trip-based insurance policy covering a second vehicle. The server 140 may generate a request to the user to choose whether the user would like to add a new trip-based insurance policy or add additional trip-based insurance to the existing policies. In some embodiments, the identification of one or more existing insurance policies may also affect the cost per use unit determined in block 306.

With the information received and identified in block 302 and 304, the server 140 may determine one or more costs per vehicle use unit at block 306. The cost per vehicle use unit may be a rate charged to insure the vehicle 108 during a vehicle trip or some portion thereof. For example, the cost per vehicle unit may be a fee (e.g., $2.22, $5.87, etc.) for a level of insurance coverage (e.g., state minimum liability coverage, collision coverage up to $10,000 with a $500 deductible, etc.) that is in force only for the duration of the vehicle trip. In some embodiments, a number of costs per vehicle use unit may be determined, each corresponding to a policy coverage level (e.g., $150,000 liability coverage with a $5,000 deductible, $250,000 liability coverage with no deductible, etc.). For example, one cost per vehicle use unit may cover vehicle trips for commuting (e.g., 30 miles round-trip on over 12 hours on weekdays) and another cost per vehicle use unit may cover vehicle trips for leisure (e.g., 150 miles round-trip over 48 hours). As another example, the user may purchase roadside assistance coverage only on vehicle trips longer than 50 miles or that take the vehicle more than 20 miles from home. Alternatively, the user may pre-select a policy coverage level for which the server 140 may then determine one or more costs per vehicle use unit. The cost per vehicle use unit may depend upon any of the information received at block 302, as well as information regarding the vehicle operator or the vehicle 108 obtained from other sources. Such other sources of information may include records in the system database 146, police or other official records, court records, credit agency records, or reports of third-party data providers. The cost per vehicle use unit for any policy coverage level and use unit may be determined from the information received or obtained by the application of known methods of actuarial analysis.

In some embodiments, each vehicle use unit may correspond exactly to a vehicle trip, such that every vehicle trip uses one and only one vehicle use unit of the vehicle insurance policy. In other embodiments, each vehicle use unit may be limited by one or more additional metrics, such as time, duration, or stops. In a variety of embodiments, one or more of the following vehicle trip limitations may be included: a predetermined maximum distance traveled by the vehicle in one vehicle trip; a predetermined maximum duration of vehicle operation within one vehicle trip; a predetermined maximum duration during which the engine of the vehicle is running in one vehicle trip; a predetermined maximum number of times the engine of the vehicle is started or shut off in one vehicle trip; a predetermined number of times the vehicle operator enter or exits the vehicle in one vehicle trip; a predetermined number of times the vehicle is near a geographic location; a predetermined maximum speed of the vehicle during the vehicle trip; a predetermined maximum revolutions per minute of the engine of the vehicle during the vehicle trip; a predetermined maximum lateral acceleration of the vehicle during the vehicle trip; a predetermined maximum longitudinal acceleration of the vehicle during the vehicle trip; or a predetermined maximum number of occupants within the vehicle during the vehicle trip. For example, vehicle use units may be time-limited, such that a vehicle trip exceeding a predetermined time threshold (e.g., 2 hours, 24 hours, etc.) is recorded as using more than one vehicle use unit. In another example, a vehicle trip may incur the use of an additional vehicle use unit if the vehicle 108 passes a location more than a predetermined number of times, such as where the vehicle 108 makes multiple deliveries from a central location in a number of separate segments but where the central location is not a departure location of a vehicle trip (e.g., deliveries from a pizzeria).

In some embodiments, the vehicle trip limitations may be used by the server 140 to adjust the number of vehicle use units charged for a vehicle trip that exceeds the vehicle trip limitation threshold or thresholds. For example, a vehicle trip of 300 miles may incur a charge of two vehicle use units where a vehicle trip limitation of 200 miles is included in the vehicle use units. Alternatively, fractional vehicle use units may be used, such that only one and a half vehicle use units are charged in the preceding example. In other embodiments, a surcharge or additional premium rate may apply to vehicle trips that exceed the thresholds of the vehicle trip limitations. For example, a vehicle insurance policy may provide for a cost per vehicle use unit of $3.33 with a vehicle trip limitation of 60 miles and an additional premium of $0.12 per mile beyond the vehicle trip limitation.

In some embodiments, a vehicle trip may incur the use of additional vehicle use units or a monetary surcharge for unsafe vehicle operation, such as hard braking, excessive lateral or longitudinal acceleration, instances of RPM measurements above a threshold, vehicle swerving, measures of distraction or drowsiness, or other indications of unsafe vehicle operation based on telemetric or biometric measurements. For example, the vehicle trip may be analyzed upon completion, and a surcharge (e.g., 0.05 vehicle use units, $0.07, etc.) may be added for each recorded instance of hard braking. Additionally, a surcharge may be added for vehicle trips occurring at hazardous times or during inclement weather conditions.

Additionally, or alternatively, in some embodiments, vehicle trips that fail to meet a predetermined minimum threshold for duration, distance, or other metrics may be covered without incurring the use of a vehicle use unit. For example, the vehicle insurance policy may not be charged the use of one vehicle use unit where a vehicle engine operates for less than a minute or where the vehicle moves less than twenty feet. This may reduce the number of false determinations of the occurrence of a vehicle trip, such as may occur where, for example, the vehicle 108 is started solely to operate a powered feature of the vehicle 108, such as opening or closing windows.

In some embodiments, one or more costs per vehicle use unit may also be determined based upon the vehicle trip limitations discussed above. The server 140 may process the information received from the user in block 302 to determine sets of costs per vehicle use unit that vary depending upon both policy coverage levels and vehicle trip limitations. For example, a first cost per vehicle use unit may be determined that corresponds to a vehicle trip limitation of two hours, and a second cost per vehicle use unit may be determined that corresponds to a vehicle trip limitation of twenty-four hours. Similarly, a third cost per vehicle use unit may be determined that corresponds to a vehicle trip limitation of two hours and a vehicle trip limitation of thirty miles. In some embodiments, a recommended set of vehicle trip limitations (e.g., thresholds of fifty miles, two operating hours, twelve total hours, and three stops) may be determined by the server 140 based upon the vehicle use information received at block 302. In embodiments in which the vehicle trips will be individually analyzed upon completion to determine cost based on the trip characteristics, determination of the cost per vehicle trip in block 306 may include calculation of the costs a number of exemplary vehicle trips. The one or more costs per vehicle use unit determined at block 306 may be presented to the user or may be incorporated within policy premiums for one or more vehicle insurance policies offered to the user.

The server 140 may further determine one or more policy premiums for one or more vehicle insurance policies at block 308. In addition to trip-based vehicle insurance policies, in some embodiments, the vehicle insurance policies may include time-based vehicle insurance policies, distance-based vehicle insurance policies, or any combination of these or other types of vehicle insurance policies. Policy premiums for vehicle insurance policies not including trip-based vehicle insurance may be determined by the server 140 using established actuarial methods based upon the information received at block 302. Policy premiums for vehicle insurance policies including trip-based vehicle insurance may combine traditionally determined premium components (e.g., a fixed premium for a level of comprehensive vehicle insurance coverage for a fixed period of time) with premiums determined for one or more quantities of vehicle use units (e.g., 50 trips, 100 trips). Similarly, pure trip-based vehicle insurance policy premiums may be determined by the product of the cost per vehicle use unit and the quantity of vehicle use units, which premium may be adjusted in some embodiments (e.g., by applying a discount to policies with quantities of vehicle use units above a set level). In some embodiments, the policy premiums may include a schedule of charges for unsafe vehicle operation or vehicle operation under hazardous conditions, in addition to one or more baseline costs per vehicle trip.

The server 140 may then provide one or more vehicle insurance policies to the user at block 310. This may include transmitting information regarding the one or more vehicle insurance policies (e.g., terms, descriptions, explanations, premiums, etc.) from the server 140 to the client device 110 via the network 130. The client device 110 may then use the display 202 to present the policy options to the user, which may include one or more quantity options for vehicle use units. The information provided to the user may include options for one or more types of traditional or trip-based vehicle insurance coverage, one or more classes of coverage levels (e.g., standard, economy, minimum required, etc.), one or more coverage levels, one or more deductible levels, one or more types of vehicle use units corresponding to sets of vehicle trip limitations, one or more quantities of vehicle use units, and cost or policy premium information relating to any of the policy and quantity options.

The client device 110 may be configured to allow the user to select one or more vehicle insurance policy options and quantities using an input device (not shown). In some embodiments, the client application 232 or the vehicle insurance purchase routine 238 may prompt the user to select one or more policy or quantity options or may receive user selections from among the options provided in block 310. The client device 110 may communicate the vehicle insurance policy and vehicle use unit quantity selections of the user to the server 140 via the network 130 at block 312. Alternatively, or additionally, in some embodiments, the server 140 may provide a range of vehicle insurance policy options to be presented to the user and receive a selection of one or more types of policies prior to determining the cost per vehicle use unit or the policy premiums or prior to providing the policy and quantity options as discussed above.

Upon receiving the user selections at block 312, the server 140 may facilitate a purchase of the one or more selected vehicle insurance policies selected by the user at block 314. The purchase may be facilitated by any of the various known techniques, including receiving an electronic payment from the user, receiving a purchase order to be invoiced, or generating a purchase order number for the customer to use in completing the purchase at a physical office location, by telephone, or otherwise. Upon confirmation or completion of the order, the server 140 may provide the user with additional required or optional documentation regarding the purchased vehicle insurance policy, including proof of insurance.

Once the trip-based vehicle insurance policy has been purchased and is in force, the server 140 may continue to monitor vehicle use at block 316 to identify and record each vehicle trip. Monitoring use of the vehicle 108 may be performed by communication with the client device 110, the on-board computer 114, or a dedicated monitoring device. In some embodiments, the dedicated monitoring device may be removably or irremovably installed within the vehicle 108. In other embodiments, the dedicated monitoring device may include a sensor that detects when the vehicle 108 is near a location (e.g., in a garage or driveway, over a mat placed on a parking spot, etc.) that serves as the departure location and terminal location of the vehicle trips. The sensor may communicate with the client device 110, the on-board computer 114, or the server 140 in some embodiments, and the sensor may consist of any known techniques for sensing the presence of a vehicle (e.g., infrared sensing, magnetic sensing, proximity sensing, etc.).

When the client device 110, on-board computer 114, or dedicated monitoring device determines the occurrence of a vehicle trip, it may further record information regarding the vehicle trip. The information may be transmitted to the server 140 either as it is recorded or at a later point (e.g., at the completion of the vehicle trip), and the server 140 may further record the information in the system database 146. Such information may include a timestamp corresponding to the vehicle trip, a start time of the vehicle trip, an end time of the vehicle trip, a distance traveled, a starting location of the vehicle trip, or a terminal location of the vehicle trip. The server 140 may further receive and record information regarding the vehicle operation, including vehicle speed, number of stops, measurements of acceleration during the vehicle trip, indications of swerving or hard braking, weather conditions during the trip, vehicle occupants, or other information regarding the operation of the vehicle 108 at block 316.

Figure 4:
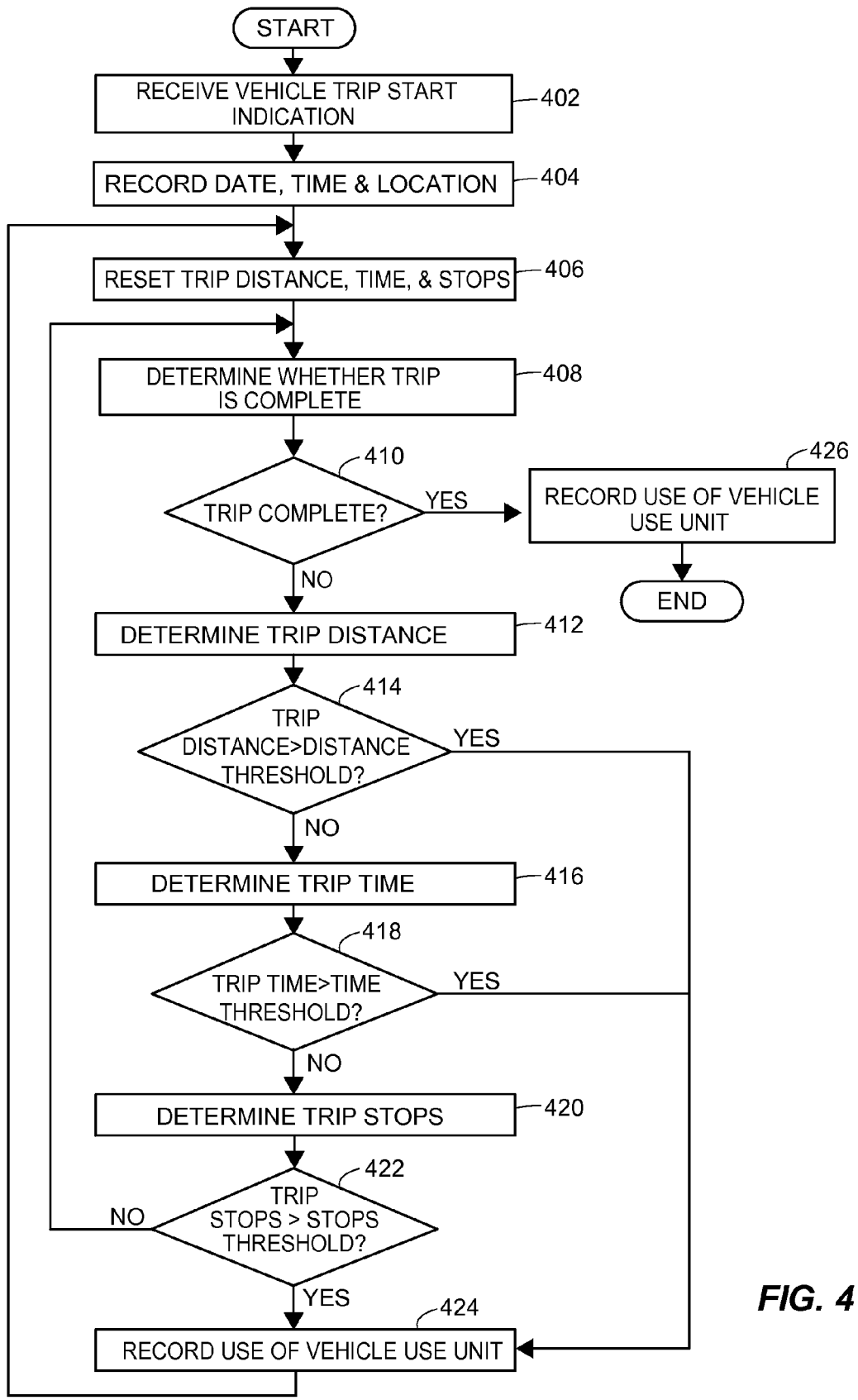
FIG. 4 illustrates a flow diagram of an exemplary trip-based insurance monitoring method in accordance with the presently described embodiments.
Figure 5:
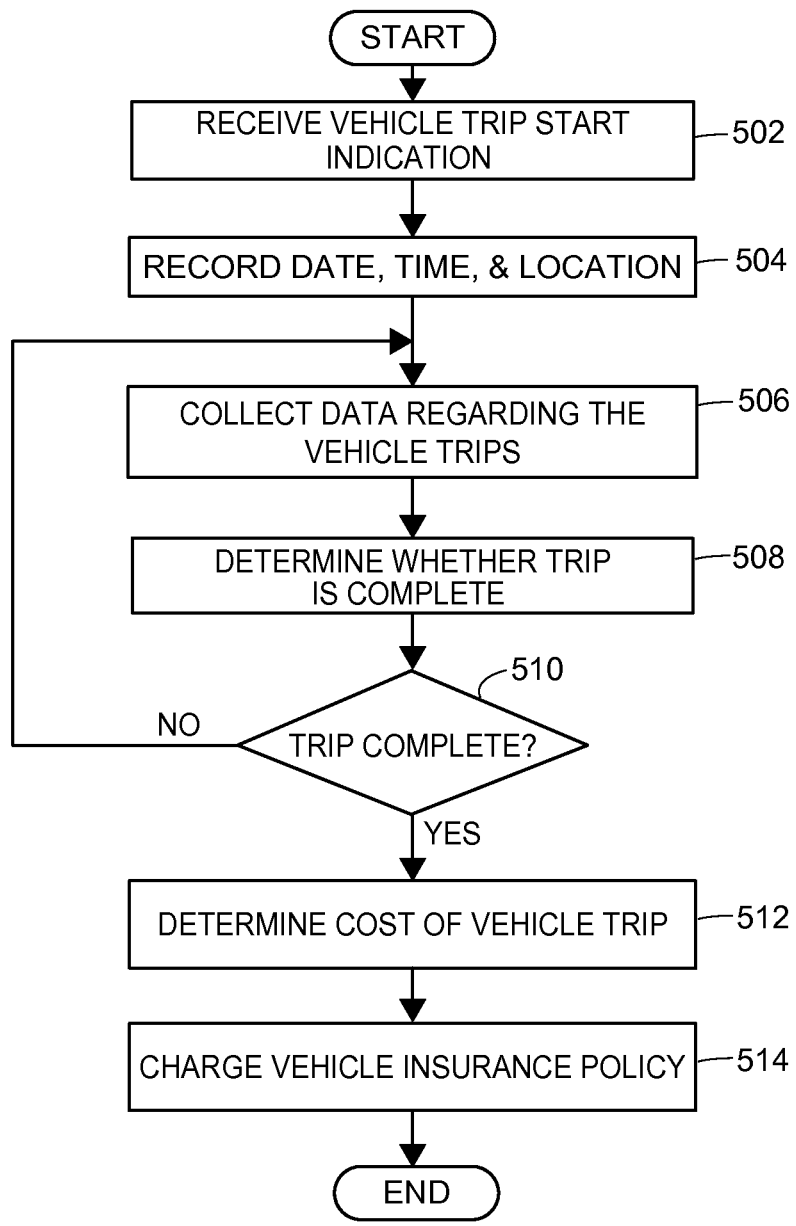
FIG. 5 illustrates a flow diagram of an exemplary trip-based insurance monitoring method wherein the cost of each vehicle trip is determined upon completion of the vehicle trip.

FIGS. 4 and 5 illustrate flow diagrams of exemplary methods for monitoring vehicle use at block 316. FIG. 4 illustrates a flow diagram of a trip-based insurance monitoring method 400 that may operate to monitor vehicle use at block 316 to track each use of a vehicle use unit of the trip-based vehicle insurance policy. The method 400 may be implemented by the client device 110, on-board computer 114, dedicated monitoring device (not shown), or by the server 140 receiving information from any of these. For clarity, the following discussion refers to an embodiment in which the client device 110 implements the method 400 and communicates with the server 140 only at the completion of the vehicle trip, but it should be understood that any of the previously mentioned configurations may instead implement the method 400.

The method 400 begins at block 402 when the client device 110 receives an indication of the start of a vehicle trip. The indication may include one or more of the following: movement of the vehicle 108 from a location the vehicle is stored; starting the engine of the vehicle 108; putting the engine of the vehicle 108 into an operational state to propel the vehicle; entry of the vehicle operator into the vehicle 108; or placement of the dedicated monitoring device within or in proximity to the vehicle 108. Additionally, or alternatively, the indication may include receiving input from the user indicating the start of a vehicle trip, such as by interacting with the client application 232 on the client device 110. For example, the client device 110 may identify a communication connection (e.g., via Bluetooth pairing) with the vehicle 108 and receive an indication from its GPS unit 206 that the client device 110 has moved to a new location while remaining communicatively connected to the vehicle 108. As another example, the on-board computer 114 may determine that the vehicle 108 has been removed beyond range of communication with a fixed-location component installed at a usual storage location of the vehicle 108 (e.g., an RFID tag or beacon placed at the entrance of a garage) and communicate this information to the client device 110. In some embodiments, receiving an indication of the start of a vehicle trip may cause the client device 110 or the on-board computer 114 to run the vehicle trip monitoring routine 240. In alternate embodiments, the vehicle 108 may be continuously monitored, in which case the occurrence of a vehicle trip may be indicated at either the start or end of the vehicle trip.

Upon receiving an indication of the start of the vehicle trip at block 402, the client device 110 may record a time stamp associated with the start of the vehicle trip at block 404. The time stamp may include the date, time of day, location, or other information related to the vehicle trip. The time stamp may be further associated with additional information during or upon completion of the vehicle trip, including the following: distance traveled, duration of the vehicle trip, duration of vehicle operation during the vehicle trip (e.g., excluding stops), terminal location of the vehicle trip, unsafe vehicle operation (e.g., hard braking, excessive acceleration, lateral swerving, etc.), weather conditions, vehicle occupants, or time, duration, and location of stops.

At the start of the trip, in some embodiments, the client device 110 may reset the values of one or more counters relating to the trip distance, the trip time (e.g., duration of the trip or time of actual vehicle operation), and the trip stops at block 406. Alternatively, this block may be excluded from the method 400 in other embodiments, particularly where the distance, time, and stops may be recalculated on a periodic or continuous basis throughout the vehicle trip.

The client device 110 may then proceed to monitor the vehicle trip limitations while the vehicle trip is in progress. The vehicle trip may be determined to be complete at block 408 upon the occurrence of one or more of the following: the return of the vehicle 108 to its starting location; the arrival of the vehicle 108 at another usual storage location; the engine of the vehicle 108 is shut off; the vehicle is taken out of an operational state to propel the vehicle 108; the vehicle operator exits the vehicle 108; the vehicle 108 is refueled. Additionally, or alternatively, the vehicle operator may provide an indication of the completion of the vehicle trip using the client device 110, the on-board computer 114, or the dedicated monitoring device (not shown). Where the trip is not complete at block 410, the client device 110 proceeds to monitor and record the use of the vehicle at blocks 412-424.

At block 412, the client device 110 determines the trip distance. This may include reading or updating a trip distance counter, comparing an odometer reading with an odometer reading recorded at the start of the trip, or any other known technique. The trip distance is then compared to a distance threshold set by the vehicle trip limitations at block 414. Where the distance the vehicle 108 has traveled during the vehicle trip exceeds the distance threshold, the use of one vehicle use unit may be recorded at block 424. Where the distance traveled is less than the distance threshold, the client device 110 then determines the trip time at block 416.

The trip time may be determined at block 416 as the time elapsed since the timestamp time at the start of the vehicle trip, the time of actual vehicle operation (e.g., the total time the vehicle engine is running or the vehicle is in gear), or the time the vehicle operator is in the vehicle. The appropriate trip time must match the vehicle trip limitation regarding time. The trip time may be determined by any appropriate means, including updating a trip time counter, comparing a system clock reading with the timestamp time recorded at the start of the trip, or any other known technique. Where the duration of the trip exceeds the time threshold, the use of one vehicle use unit may be recorded at block 424. Where the trip time is less than the time threshold, the client device 110 then determines the number of trip stops at block 420.

The trip stops may be determined at block 420 by any means, including any the following or any combination of the following: determining the number of times the vehicle engine has been started or stopped during one vehicle trip; determining the number of times the vehicle operator has entered or exited the vehicle 108 during one vehicle trip; determining the number of times the vehicle 108 has remained at the same location for a predetermined period of time (e.g., 5 minutes); determining the number of times the vehicle 108 has been located at a geographic location; determining the number of times the vehicle 108 has entered or left a known roadway using GPS data from the GPS unit 206; or receiving an indication of a vehicle stop from the vehicle operator. Where the trip stops exceed a stops threshold, the use of one vehicle use unit may be recorded at block 424. Where the number of trip stops is less than the stops threshold, the client device 110 then continues monitoring the vehicle trip until the vehicle trip is complete.

When any of the vehicle trip limitations are reached and the use of a vehicle use unit has been recorded at block 424, the client device 110 may then reset the vehicle trip counters at block 406 in some embodiments. Alternatively, the trip distance, trip time, or trip stops may be determined in blocks 412, 416, and 420, respectively, based on the most recent of either the start of the vehicle trip at block 402 or the recordation of use of a vehicle use unit at block 424. In some embodiments, the client device 110 may communicate the use of a vehicle use unit and information regarding the vehicle trip to the server 140 via the network 130 upon each recordation of a use of a vehicle use unit at block 424. The server 140 may then record the use of a vehicle use unit and charge the vehicle insurance policy accordingly.

When the vehicle trip is complete at block 410, the client device 110 may communicate information regarding the vehicle trip to the server 140 via network 130. The server 140 records the use of one or more vehicle use units and charges the vehicle use units to the trip-based vehicle insurance policy at block 426. Additionally, information regarding the trip may be associate with the timestamp created in block 404, as noted above. The timestamp and associated information may be included in the information communicated by the client device 110 to the server 140 and recorded by the server 140 in the system database 146.

Although the method 400 most directly applies to a trip-based vehicle insurance policy with vehicle trip limitations on distance, time, and stops, it should be understood that a similar method could be applied to other trip-based vehicle insurance policies with more or fewer vehicle trip limitations. For example, a trip-based vehicle insurance policy with only vehicle trip limitations on distance and stops would lack blocks 416 and 418. Alternatively, the time threshold of block 418 may instead be set to an arbitrarily high value (e.g., 100 years) to effectively prevent block 418 from triggering the use of a vehicle use unit.

FIG. 5 illustrates a flow diagram of a trip-based insurance monitoring method 500 that may operate to monitor vehicle use at block 316 to track each use of a vehicle wherein the cost of each vehicle trip is determined upon completion of the vehicle trip. The method 500 may be implemented by the client device 110, on-board computer 114, dedicated monitoring device (not shown), or by the server 140 receiving information from any of these. For clarity, the following discussion refers to an embodiment in which the client device 110 implements the method 500 and communicates with the server 140 only at the completion of the vehicle trip, but it should be understood that any of the previously mentioned configurations may instead implement the method 500.

The method 500 begins at block 502 when the client device 110 receives an indication of the start of a vehicle trip, which may include any of the indications discussed above with respect to block 402. In alternate embodiments, the vehicle 108 may be continuously monitored, in which case the occurrence of a vehicle trip may be indicated at either the start or end of the vehicle trip. Upon receiving an indication of the start of the vehicle trip at block 502, the client device 110 may record a time stamp associated with the start of the vehicle trip at block 504. The time stamp may include the date, time of day, location, or other information related to the vehicle trip. The time stamp may be further associated with additional information during or upon completion of the vehicle trip, including the following: distance traveled, duration of the vehicle trip, duration of vehicle operation during the vehicle trip (e.g., excluding stops), terminal location of the vehicle trip, unsafe vehicle operation (e.g., hard braking, excessive acceleration, lateral swerving, etc.), weather conditions, vehicle occupants, or time, duration, and location of stops.

The client device 110 may then proceed to monitor the vehicle trip limitations while the vehicle trip is in progress and collect data regarding the vehicle trip at block 506. The data may include data regarding vehicle location, stops, speed, acceleration, indicators of unsafe operation, or other information regarding vehicle operation. The data may further include information regarding weather conditions, road conditions, operating conditions, or the vehicle operator. Data may be collected from a variety of sensors within or communicatively connected to the client device 110 or the on-board computer 114. The sensors may include any device capable of providing sensor data regarding the vehicle operator, vehicle location, vehicle operation, vehicle motion, or the vehicle's environment. The sensors may include the GPS unit 206, an accelerometer unit (not shown), an image capture unit (not shown), a distance sensor (not shown), a tachometer (not shown), a speedometer (not shown), or other vehicle sensors within the vehicle 108. Additional sensors may be used to collect physiological data regarding the vehicle operator (e.g., heart rate, telematics driving score, head movement, gaze direction, gaze duration, blink rate, galvanic skin response, etc.). Additional sensor data from sensors currently existing or later developed may also be used. The data may be collected and stored on the client device 110 or may be communicated to the server 140 via the network 130.

The client device 110 may determine whether the vehicle trip is complete at block 508. The vehicle trip may be determined to be complete upon the occurrence of one or more of the following: the return of the vehicle 108 to its starting location; the arrival of the vehicle 108 at another usual storage location; the engine of the vehicle 108 is shut off; the vehicle is taken out of an operational state to propel the vehicle 108; the vehicle operator exits the vehicle 108; the vehicle 108 is refueled. Additionally, or alternatively, the vehicle operator may provide an indication of the completion of the vehicle trip using the client device 110, the on-board computer 114, or the dedicated monitoring device (not shown). Where the trip is not complete at block 510, the client device 110 proceeds to collect data regarding the use of the vehicle at block 506.

When the trip is complete at block 510, the client device 110 may communicate the information regarding the vehicle trip to the server 140, which may determine the cost of the vehicle trip at block 512. Alternatively, the client device 110 may determine the cost of the vehicle trip and communicate the cost of the vehicle trip to the server 140. The cost of the vehicle trip may be determined based upon the distance, duration, stops, external conditions, or operation of the vehicle during the vehicle trip. Any of the vehicle trip limitations mentioned above or other types of vehicle trip limitations may be included in the determination of the cost of the vehicle trip. For example, the cost of the vehicle trip may include a baseline cost based on distance, adjustments for time of day and weather conditions, and surcharges for unsafe vehicle operation (e.g., 0.05 vehicle use units for each instance of hard braking, 0.07 vehicle use units for each instance of swerving, or 0.1 vehicle use units for each phone call during the vehicle trip, etc.). Once the cost of the vehicle trip has been determined at block 512, the server 140 may record the vehicle trip cost and, finally, charge or debit the vehicle insurance policy at block 514. In some embodiments, charging or debiting the vehicle insurance policy may include recording the use of a whole or fractional number of vehicle use units. In alternate embodiments, charging or debiting the vehicle insurance policy may include charging or debiting a monetary cost for the trip from the remaining balance of the initial monetary value of the policy purchased by the customer.

Returning again to FIG. 3, the server 140 may determine the number of remaining vehicle use units at block 318. Recording the vehicle trips and usage of vehicle use units allows the server 140 to determine the number of vehicle use units remaining before the trip-based vehicle insurance policy expires. In some embodiments, the remaining vehicle use units may be determined by the client device 110, the on-board computer 114, or the server 140 at block 318 by calculating the difference between the purchased vehicle use units and the recorded uses of vehicle use units. Alternatively, the remaining vehicle use units may be estimated by the server 140 based on other know information, such as past vehicle trip frequency and time elapsed since the previous purchase. In various embodiments, the determination of remaining vehicle use units may be performed periodically (e.g., weekly) or upon the occurrence of each use of a vehicle use unit. In some embodiments, determination of the number of remaining vehicle use units may correspond to the determination of a remaining monetary value of the vehicle insurance policy.

The server 140 may then compare the remaining vehicle use units determined at block 318 with a predetermined threshold (e.g., two units, five units, ten units, etc.) at block 320. When the number of remaining vehicle use units falls below the predetermined threshold, the server 140 may further determine at block 322 whether the vehicle insurance policy is configured to automatically renew with the purchase of additional vehicle use units. If the vehicle insurance policy is not configured to automatically renew, a notification alerting the vehicle operator or customer may be generated by the server 140 and provided to the vehicle operator or customer. More than one threshold may be used to generate a plurality of notifications in some embodiments. When all vehicle use units purchased in a trip-based vehicle insurance policy have been used, the policy may expire, or a portion of the policy that is time-based or distance-based may remain in force according to the policy terms.

When the server 140 determines that the vehicle insurance policy is configured to automatically renew upon reaching the predetermined threshold at block 322, the server 140 may then facilitate an additional purchase of vehicle use units at block 326 according to the same terms as previously in effect. The purchase may be facilitated by any of the various known techniques, including receiving an electronic payment from the user, receiving a purchase order to be invoiced, or generating a purchase order number for the customer to use in confirming the purchase at a physical office location, by telephone, or otherwise. In some embodiments, a financial account (e.g., a checking account at a bank) or a revolving account (e.g., a credit card) may be connected to the vehicle insurance policy, and the server 140 may charge or debit the cost of the additional purchase to the account. Upon confirmation or completion of the order, the server 140 may provide the user with additional required or optional documentation regarding the purchased vehicle insurance policy, including proof of insurance. The server 140 may then continue to monitor vehicle use at block 316.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A computer-implemented method for offering vehicle insurance for a vehicle, comprising: receiving, by one or more processors, a vehicle identifier that identifies the vehicle and a vehicle operator identifier that identifies a vehicle operator; determining, by one or more processors, a cost per vehicle use unit based at least in part on the vehicle identifier and the vehicle operator identifier; generating, by one or more processors, at least one vehicle insurance policy based at least in part on the cost per vehicle use unit; and providing, by one or more processors, an option to purchase the vehicle insurance policy to a customer associated with the vehicle.

2. The method according to aspect 1, wherein the cost per vehicle use unit comprises a cost associated with a vehicle trip, the vehicle trip including at least one of: each round trip from and back to a location; each time an engine of the vehicle is started; each time the engine of the vehicle is shut off; each time the engine of the vehicle is put into an operational state to propel the vehicle; each time the engine of the vehicle is taken out of an operational state to propel the vehicle; each time the vehicle operator enters the vehicle; each time the vehicle operator exits the vehicle; each time the vehicle arrives at a geographic location; each time the vehicle leaves a geographic location; or each time the vehicle is refueled.

3. The method according to either aspect 1 or aspect 2, wherein the cost per vehicle use unit further comprises a cost associated with a vehicle trip limitation, the vehicle trip limitation including at least one of: a predetermined maximum distance traveled by the vehicle in one vehicle trip; a predetermined maximum duration of vehicle operation within one vehicle trip; a predetermined maximum duration during which the engine of the vehicle is running in one vehicle trip; a predetermined maximum number of times the engine of the vehicle is started or shut off in one vehicle trip; a predetermined number of times the vehicle operator enter or exits the vehicle in one vehicle trip; a predetermined number of times the vehicle is near a geographic location; a predetermined maximum speed of the vehicle during the vehicle trip; a predetermined maximum revolutions per minute of the engine of the vehicle during the vehicle trip; a predetermined maximum lateral acceleration of the vehicle during the vehicle trip; a predetermined maximum longitudinal acceleration of the vehicle during the vehicle trip; a predetermined maximum number of occupants within the vehicle during the vehicle trip; an indication of unsafe vehicle operation; or an indication of hazardous weather conditions.

4. The method according to any one of the preceding aspects, further comprising: receiving, by one or more processors, a selection by the customer of the vehicle insurance policy; facilitating, by one or more processors, a purchase transaction with the customer for the selected vehicle insurance policy; receiving, by one or more processors, a signal indicating an occurrence of the vehicle trip; and recording, by one or more processors, a record of the occurrence of the vehicle trip.

5. The method according to any one of the preceding aspects, wherein recording the record of the occurrence of the vehicle trip further comprises recording, by one or more processors, a timestamp of the occurrence, the timestamp including at least one of: a start time of the vehicle trip, an end time of the vehicle trip, a distance traveled, a starting location of the vehicle trip, a terminal location of the vehicle trip, an indication of unsafe vehicle operation, an indication of weather conditions, or an indication of occupants of the vehicle.

6. The method according to any one of the preceding aspects, further comprising: determining, by one or more processors, a number of remaining vehicle use units in the purchased vehicle insurance policy; and facilitating, by one or more processors, an additional purchase transaction with the customer to purchase additional vehicle trips without further action by the customer when the number of remaining vehicle use units falls below a predetermined threshold.

7. The method according to any one of the preceding aspects, wherein providing the option to purchase the vehicle insurance policy to the customer further comprises: providing, by one or more processors, an option to purchase at least one type of vehicle insurance coverage, and providing, by one or more processors, an option to purchase at least one quantity of vehicle use units.

8. The method according to any one of the preceding aspects, further comprising: receiving, by one or more processors, a selection by the customer of the vehicle insurance policy; and facilitating, by one or more processors, a purchase transaction with the customer for the selected vehicle insurance policy.

9. The method according to any one of the preceding aspects, wherein presenting the option to purchase the vehicle insurance policy to the customer further comprises: identifying, by one or more processors, an existing insurance policy associated with the customer; and providing to the customer, by one or more processors, an option to supplement the existing insurance policy with the vehicle insurance policy.

10. The method according to any one of the preceding aspects, further comprising receiving, by one or more processors, a vehicle use identifier that identifies information regarding a recurring use of the vehicle by the vehicle operator, the information including at least one of: a parking location, a destination location, a route, a type of use, a time of use, a pattern of unsafe vehicle operation, a number of occupants within the vehicle, or a cargo; wherein the cost per vehicle use unit is based, at least in part, on the vehicle use identifier.

11. A computer system for offering vehicle insurance for a vehicle, comprising: a communication module adapted to communicate data; a program memory adapted to store non-transitory computer executable instructions; and at least one processor adapted to interface with the communication module, wherein the processor is configured to execute the non-transitory computer executable instructions to cause the computer system to: receive a vehicle identifier that identifies the vehicle and a vehicle operator identifier that identifies a vehicle operator; determine a cost per vehicle use unit based at least in part on the vehicle identifier and the vehicle operator identifier; generate at least one vehicle insurance policy based at least in part on the cost per vehicle use unit; and provide, to a customer associated with the vehicle via the communication module, an option to purchase the vehicle insurance policy to a customer associated with the vehicle.

12. The computer system according to aspect 11, wherein the cost per vehicle use unit comprises a cost associated with a vehicle trip, the vehicle trip including at least one of: each round trip from and back to a location; each time an engine of the vehicle is started; each time the engine of the vehicle is shut off; each time the engine of the vehicle is put into an operational state to propel the vehicle; each time the engine of the vehicle is taken out of an operational state to propel the vehicle; each time the vehicle operator enters the vehicle; each time the vehicle operator exits the vehicle; each time the vehicle arrives at a geographic location; each time the vehicle leaves a geographic location; or each time the vehicle is refueled.

13. The computer system according to either aspect 11 or aspect 12, wherein the cost per vehicle use unit further comprises a cost associated with a vehicle trip limitation, the vehicle trip limitation including at least one of: a predetermined maximum distance traveled by the vehicle in one vehicle trip; a predetermined maximum duration of vehicle operation within one vehicle trip; a predetermined maximum duration during which the engine of the vehicle is running in one vehicle trip; a predetermined maximum number of times the engine of the vehicle is started or shut off in one vehicle trip; a predetermined number of times the vehicle operator enter or exits the vehicle in one vehicle trip; a predetermined number of times the vehicle is near a geographic location; a predetermined maximum speed of the vehicle during the vehicle trip; a predetermined maximum revolutions per minute of the engine of the vehicle during the vehicle trip; a predetermined maximum lateral acceleration of the vehicle during the vehicle trip; a predetermined maximum longitudinal acceleration of the vehicle during the vehicle trip; a predetermined maximum number of occupants within the vehicle during the vehicle trip; an indication of unsafe vehicle operation; or an indication of hazardous weather conditions.

14. The computer system according to any of aspects 11-13, wherein the executable instructions further cause the computer system to: receive, from the customer via the communication module, a selection of the vehicle insurance policy; facilitate a purchase transaction with the customer for the vehicle insurance policy; receive, via the communication module, a signal indicating an occurrence of the vehicle trip; and record a timestamp of the occurrence of the vehicle trip, the timestamp comprising at least one of: a start time of the vehicle trip, an end time of the vehicle trip, a distance traveled, a starting location of the vehicle trip, a terminal location of the vehicle trip, an indication of unsafe vehicle operation, an indication of weather conditions, or an indication of occupants of the vehicle.

15. The computer system according to any of aspects 11-14, wherein the executable instructions that cause the computer system to receive the signal indicating the occurrence of the vehicle trip further comprise instructions that cause the computer system to receive, via the communication module, a signal from a sensor configured to generate the signal indicating the occurrence of the vehicle trip.

16. A tangible, non-transitory computer-readable medium storing instructions for offering vehicle insurance for a vehicle that when executed by at least one processor of a computer system cause the computer system to: receive a vehicle identifier that identifies the vehicle and a vehicle operator identifier that identifies a vehicle operator; determine a cost per vehicle use unit based at least in part on the vehicle identifier and the vehicle operator identifier; generate at least one vehicle insurance policy based at least in part on the cost per vehicle use unit; and provide, to a customer associated with the vehicle, an option to purchase the vehicle insurance policy.

17. The tangible, non-transitory computer-readable medium according to aspect 16, wherein the cost per vehicle use unit comprises a cost associated with a vehicle trip, the vehicle trip including at least one of: each round trip from and back to a location; each time an engine of the vehicle is started; each time the engine of the vehicle is shut off; each time the engine of the vehicle is put into an operational state to propel the vehicle; each time the engine of the vehicle is taken out of an operational state to propel the vehicle; each time the vehicle operator enters the vehicle; each time the vehicle operator exits the vehicle; each time the vehicle arrives at a geographic location; each time the vehicle leaves a geographic location; or each time the vehicle is refueled.

18. The tangible, non-transitory computer-readable medium according to either of aspect 16 or aspect 17, wherein the cost per vehicle use unit further comprises a cost associated with a vehicle trip limitation, the vehicle trip limitation including at least one of: a predetermined maximum distance traveled by the vehicle in one vehicle trip; a predetermined maximum duration of vehicle operation within one vehicle trip; a predetermined maximum duration during which the engine of the vehicle is running in one vehicle trip; a predetermined maximum number of times the engine of the vehicle is started or shut off in one vehicle trip; a predetermined number of times the vehicle operator enter or exits the vehicle in one vehicle trip; a predetermined number of times the vehicle is near a geographic location; a predetermined maximum speed of the vehicle during the vehicle trip; a predetermined maximum revolutions per minute of the engine of the vehicle during the vehicle trip; a predetermined maximum lateral acceleration of the vehicle during the vehicle trip; a predetermined maximum longitudinal acceleration of the vehicle during the vehicle trip; a predetermined maximum number of occupants within the vehicle during the vehicle trip; an indication of unsafe vehicle operation; or an indication of hazardous weather conditions.

19. The tangible, non-transitory computer-readable medium according to any of aspects 16-18, wherein the executable instructions further comprise executable instructions that when executed by the at least one processor cause the computer system to: receive a selection of the vehicle insurance policy from the customer; facilitate a purchase transaction with the customer for the vehicle insurance policy; receive a signal indicating an occurrence of the vehicle trip; and record a timestamp of the occurrence of the vehicle trip, the timestamp comprising at least one of: a start time of the vehicle trip, an end time of the vehicle trip, a distance traveled, a starting location of the vehicle trip, a terminal location of the vehicle trip, an indication of unsafe vehicle operation, an indication of weather conditions, or an indication of occupants of the vehicle.

20. The tangible, non-transitory computer-readable medium according to any of aspects 16-19, wherein the executable instructions that when executed by the at least one processor cause the computer system to provide the option to purchase the vehicle insurance policy further comprise executable instructions that when executed by the at least one processor cause the computer system to: identify an existing insurance policy associated with the customer; and provide, to the customer, an option to supplement the existing insurance policy with the vehicle insurance policy.

What is claimed is:

1. A computer-implemented method for offering vehicle insurance for a vehicle, comprising:
   receiving, at one or more processors, a vehicle identifier that identifies the vehicle and a vehicle operator identifier that identifies a vehicle operator;
   determining, by one or more processors configured to implement a cost determination routine, a cost per vehicle use unit based at least in part on the vehicle identifier and the vehicle operator identifier, wherein the cost per vehicle use unit comprises a fixed cost per vehicle trip;
   generating, by one or more processors configured to implement a policy generation routine, at least one vehicle insurance policy based at least in part on the cost per vehicle use unit;
   providing, by one or more processors, an option to purchase the vehicle insurance policy to a customer associated with the vehicle;
   receiving, from a GPS unit, location data indicating one or more locations of the vehicle; and
   determining, by one or more processors, the occurrence of a vehicle trip based upon the received location data.

2. The method of claim 1, wherein the vehicle trip includes at least one of: each round trip from and back to a location; each time an engine of the vehicle is started; each time the engine of the vehicle is shut off; each time the engine of the vehicle is put into an operational state to propel the vehicle; each time the engine of the vehicle is taken out of an operational state to propel the vehicle; each time the vehicle operator enters the vehicle; each time the vehicle operator exits the vehicle; each time the vehicle arrives at a geographic location; each time the vehicle leaves a geographic location; or each time the vehicle is refueled.

3. The method of claim 2, wherein the cost per vehicle use unit further comprises a cost associated with a vehicle trip limitation, the vehicle trip limitation including at least one of: a predetermined maximum distance traveled by the vehicle in one vehicle trip; a predetermined maximum duration of vehicle operation within one vehicle trip; a predetermined maximum duration during which the engine of the vehicle is running in one vehicle trip; a predetermined maximum number of times the engine of the vehicle is started or shut off in one vehicle trip; a predetermined number of times the vehicle operator enter or exits the vehicle in one vehicle trip; a predetermined number of times the vehicle is near a geographic location; a predetermined maximum speed of the vehicle during the vehicle trip; a predetermined maximum revolutions per minute of the engine of the vehicle during the vehicle trip; a predetermined maximum lateral acceleration of the vehicle during the vehicle trip; a predetermined maximum longitudinal acceleration of the vehicle during the vehicle trip; a predetermined maximum number of occupants within the vehicle during the vehicle trip; an indication of unsafe vehicle operation; or an indication of hazardous weather conditions.

4. The method of claim 2, further comprising:
   receiving, by one or more processors, a selection by the customer of the vehicle insurance policy;

facilitating, by one or more processors, a purchase transaction with the customer for the selected vehicle insurance policy;
receiving, by one or more processors, a signal indicating the determined occurrence of the vehicle trip; and
recording, by one or more processors, a record of the occurrence of the vehicle trip.

5. The method of claim 4, wherein recording the record of the occurrence of the vehicle trip further comprises recording, by one or more processors, a timestamp of the occurrence, the timestamp including at least one of: a start time of the vehicle trip, an end time of the vehicle trip, a distance traveled, a starting location of the vehicle trip, a terminal location of the vehicle trip, an indication of unsafe vehicle operation, an indication of weather conditions, or an indication of occupants of the vehicle.

6. The method of claim 4, further comprising:
determining, by one or more processors, a number of remaining vehicle use units in the purchased vehicle insurance policy; and
facilitating, by one or more processors, an additional purchase transaction with the customer to purchase additional vehicle trips without further action by the customer when the number of remaining vehicle use units falls below a predetermined threshold.

7. The method of claim 1, wherein providing the option to purchase the vehicle insurance policy to the customer further comprises:
providing, by one or more processors, an option to purchase at least one type of vehicle insurance coverage, and
providing, by one or more processors, an option to purchase at least one quantity of vehicle use units.

8. The method of claim 7, further comprising:
receiving, by one or more processors, a selection by the customer of the vehicle insurance policy; and
facilitating, by one or more processors, a purchase transaction with the customer for the selected vehicle insurance policy.

9. The method of claim 1, wherein presenting the option to purchase the vehicle insurance policy to the customer further comprises:
identifying, by one or more processors, an existing insurance policy associated with the customer; and
providing to the customer, by one or more processors, an option to supplement the existing insurance policy with the vehicle insurance policy.

10. The method of claim 1, further comprising receiving, by one or more processors, a vehicle use identifier that identifies information regarding a recurring use of the vehicle by the vehicle operator, the information including at least one of: a parking location, a destination location, a route, a type of use, a time of use, a pattern of unsafe vehicle operation, a number of occupants within the vehicle, or a cargo; wherein the cost per vehicle use unit is based, at least in part, on the vehicle use identifier.

11. A computer system for offering vehicle insurance for a vehicle, comprising:
a communication module adapted to communicate data;
a GPS unit;
a program memory adapted to store non-transitory computer executable instructions; and
at least one processor adapted to interface with the communication module, wherein the processor is configured to execute the non-transitory computer executable instructions to cause the computer system to:
receive a vehicle identifier that identifies the vehicle and a vehicle operator identifier that identifies a vehicle operator;
determine a cost per vehicle use unit based at least in part on the vehicle identifier and the vehicle operator identifier, wherein the cost per vehicle use unit comprises a fixed cost per vehicle trip;
generate at least one vehicle insurance policy based at least in part on the cost per vehicle use unit;
provide, to a customer associated with the vehicle via the communication module, an option to purchase the vehicle insurance policy to a customer associated with the vehicle;
receive, from the GPS unit communicatively connected to the at least one processor, location data indicating one or more locations of the vehicle; and
determine the occurrence of a vehicle trip based upon the received location data.

12. The computer system of claim 11, wherein the vehicle trip includes at least one of: each round trip from and back to a location; each time an engine of the vehicle is started; each time the engine of the vehicle is shut off; each time the engine of the vehicle is put into an operational state to propel the vehicle; each time the engine of the vehicle is taken out of an operational state to propel the vehicle; each time the vehicle operator enters the vehicle; each time the vehicle operator exits the vehicle; each time the vehicle arrives at a geographic location; each time the vehicle leaves a geographic location; or each time the vehicle is refueled.

13. The computer system of claim 12, wherein the cost per vehicle use unit further comprises a cost associated with a vehicle trip limitation, the vehicle trip limitation including at least one of: a predetermined maximum distance traveled by the vehicle in one vehicle trip; a predetermined maximum duration of vehicle operation within one vehicle trip; a predetermined maximum duration during which the engine of the vehicle is running in one vehicle trip; a predetermined maximum number of times the engine of the vehicle is started or shut off in one vehicle trip; a predetermined number of times the vehicle operator enter or exits the vehicle in one vehicle trip; a predetermined number of times the vehicle is near a geographic location; a predetermined maximum speed of the vehicle during the vehicle trip; a predetermined maximum revolutions per minute of the engine of the vehicle during the vehicle trip; a predetermined maximum lateral acceleration of the vehicle during the vehicle trip; a predetermined maximum longitudinal acceleration of the vehicle during the vehicle trip; a predetermined maximum number of occupants within the vehicle during the vehicle trip; an indication of unsafe vehicle operation; or an indication of hazardous weather conditions.

14. The computer system of claim 12, wherein the executable instructions further cause the computer system to:
receive, from the customer via the communication module, a selection of the vehicle insurance policy;
facilitate a purchase transaction with the customer for the vehicle insurance policy;
receive, via the communication module, a signal indicating the determined occurrence of the vehicle trip; and
record a timestamp of the occurrence of the vehicle trip, the timestamp comprising at least one of: a start time of the vehicle trip, an end time of the vehicle trip, a distance traveled, a starting location of the vehicle trip, a terminal location of the vehicle trip, an indication of unsafe vehicle operation, an indication of weather conditions, or an indication of occupants of the vehicle.

15. The computer system of claim 14, wherein the executable instructions that cause the computer system to receive the signal indicating the occurrence of the vehicle trip further comprise instructions that cause the computer system to receive, via the communication module, a signal from a sensor configured to generate the signal indicating the occurrence of the vehicle trip.

16. A tangible, non-transitory computer-readable medium storing instructions for offering vehicle insurance for a vehicle that when executed by at least one processor of a computer system cause the computer system to:
receive a vehicle identifier that identifies the vehicle and a vehicle operator identifier that identifies a vehicle operator;
determine a cost per vehicle use unit based at least in part on the vehicle identifier and the vehicle operator identifier, wherein the cost per vehicle use unit comprises a fixed cost per vehicle trip;
generate at least one vehicle insurance policy based at least in part on the cost per vehicle use unit; and
provide, to a customer associated with the vehicle, an option to purchase the vehicle insurance policy;
receive, from a GPS unit communicatively connected to the at least one processor of the computer system, location data indicating one or more locations of the vehicle; and
determine the occurrence of a vehicle trip based upon the received location data.

17. The tangible, non-transitory computer-readable medium of claim 16, wherein the vehicle trip includes at least one of: each round trip from and back to a location; each time an engine of the vehicle is started; each time the engine of the vehicle is shut off; each time the engine of the vehicle is put into an operational state to propel the vehicle; each time the engine of the vehicle is taken out of an operational state to propel the vehicle; each time the vehicle operator enters the vehicle; each time the vehicle operator exits the vehicle; each time the vehicle arrives at a geographic location; each time the vehicle leaves a geographic location; or each time the vehicle is refueled.

18. The tangible, non-transitory computer-readable medium of claim 16, wherein the cost per vehicle use unit further comprises a cost associated with a vehicle trip limitation, the vehicle trip limitation including at least one of: a predetermined maximum distance traveled by the vehicle in one vehicle trip; a predetermined maximum duration of vehicle operation within one vehicle trip; a predetermined maximum duration during which the engine of the vehicle is running in one vehicle trip; a predetermined maximum number of times the engine of the vehicle is started or shut off in one vehicle trip; a predetermined number of times the vehicle operator enter or exits the vehicle in one vehicle trip; a predetermined number of times the vehicle is near a geographic location; a predetermined maximum speed of the vehicle during the vehicle trip; a predetermined maximum revolutions per minute of the engine of the vehicle during the vehicle trip; a predetermined maximum lateral acceleration of the vehicle during the vehicle trip; a predetermined maximum longitudinal acceleration of the vehicle during the vehicle trip; a predetermined maximum number of occupants within the vehicle during the vehicle trip; an indication of unsafe vehicle operation; or an indication of hazardous weather conditions.

19. The tangible, non-transitory computer-readable medium of claim 17, wherein the executable instructions further comprise executable instructions that when executed by the at least one processor cause the computer system to:
receive a selection of the vehicle insurance policy from the customer;
facilitate a purchase transaction with the customer for the vehicle insurance policy;
receive a signal indicating the determined occurrence of the vehicle trip; and
record a timestamp of the occurrence of the vehicle trip, the timestamp comprising at least one of: a start time of the vehicle trip, an end time of the vehicle trip, a distance traveled, a starting location of the vehicle trip, a terminal location of the vehicle trip, an indication of unsafe vehicle operation, an indication of weather conditions, or an indication of occupants of the vehicle.

20. The tangible, non-transitory computer-readable medium of claim 16, wherein the executable instructions that when executed by the at least one processor cause the computer system to provide the option to purchase the vehicle insurance policy further comprise executable instructions that when executed by the at least one processor cause the computer system to:
identify an existing insurance policy associated with the customer; and
provide, to the customer, an option to supplement the existing insurance policy with the vehicle insurance policy.

* * * * *